United States Patent
Qian et al.

(10) Patent No.: US 7,745,983 B2
(45) Date of Patent: Jun. 29, 2010

(54) FIELD EMISSION PLANE LIGHT SOURCE AND METHOD FOR MAKING THE SAME

(75) Inventors: Li Qian, Beijing (CN); Liang Liu, Beijing (CN); Peng Liu, Beijing (CN); Jie Tang, Beijing (CN); Yang Wei, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 628 days.

(21) Appl. No.: 11/603,639

(22) Filed: Nov. 21, 2006

(65) Prior Publication Data
US 2007/0222364 A1    Sep. 27, 2007

(30) Foreign Application Priority Data
Mar. 24, 2006    (CN) .................. 2006 1 0060043

(51) Int. Cl.
*H01J 1/62* (2006.01)
(52) U.S. Cl. .................. 313/495; 313/496; 445/24; 445/25
(58) Field of Classification Search ......... 313/495–496; 445/24–25, 51
See application file for complete search history.

(56) References Cited

U.S. PATENT DOCUMENTS

| | | | |
|---|---|---|---|
| 5,498,925 A * | 3/1996 | Bell et al. .................. 313/497 |
| 6,042,443 A | 3/2000 | Carella et al. |
| 6,111,354 A * | 8/2000 | Fink et al. .................. 313/495 |
| 6,250,984 B1 * | 6/2001 | Jin et al. ..................... 445/51 |
| 2002/0074932 A1 * | 6/2002 | Bouchard et al. ........... 313/495 |
| 2003/0160561 A1 * | 8/2003 | Park et al. .................. 313/495 |
| 2005/0140269 A1 * | 6/2005 | Hwang ....................... 313/497 |

FOREIGN PATENT DOCUMENTS

| | | |
|---|---|---|
| CN | 1707731 A | 12/2005 |
| CN | 1750222 A | 3/2006 |
| TW | 262561 | 11/1995 |
| TW | 289203 | 10/1996 |
| TW | 571328 B | 1/2004 |

* cited by examiner

*Primary Examiner*—Nimeshkumar D Patel
*Assistant Examiner*—Mary Ellen Bowman
(74) *Attorney, Agent, or Firm*—Jeffrey T. Knapp

(57) ABSTRACT

A field emission plane light source generally incorporates an anode and a cathode. The anode includes an anode substrate, an anode conductive layer formed on a surface of the anode substrate, and a fluorescent layer formed on the anode conductive layer. The cathode includes a cathode substrate facing and separated from the anode substrate, a cathode conductive layer formed on a surface of the cathode substrate, and an electron emission layer formed on the cathode conductive layer and facing the fluorescent layer of the anode. The cathode and anode substrates have a seal formed therebetween. The electron emission layer includes a glass matrix and a plurality of carbon nanotubes, metallic conductive particles and getter powders dispersed therein. A method for making such field emission plane light source is also provided.

15 Claims, 3 Drawing Sheets

FIELD EMISSION PLANE LIGHT SOURCE AND METHOD FOR MAKING THE SAME

RELATED APPLICATIONS

This application is related to commonly-assigned applications entitled, "FIELD EMISSION LAMP AND METHOD FOR MAKING THE SAME", Ser. No. 11/603,628, filed Nov. 21, 2006, "FIELD EMISSION LAMP AND METHOD FOR MAKING THE SAME", Ser. No. 11/603,640, filed Nov. 21, 2006, "FIELD EMISSION DOUBLE-PLANE LIGHT SOURCE AND METHOD FOR MAKING THE SAME", Ser. No. 11/603,627, filed Nov. 21, 2006, and "FIELD EMISSION ELECTRON SOURCE AND METHOD FOR MAKING THE SAME", Ser. No. 11/603,672, filed Nov. 21, 2006, the contents of each of which are hereby incorporated by reference thereto.

BACKGROUND

1. Technical Field

The invention relates generally to cold cathode luminescent field emission devices and, particularly, to a field emission plane light source employing a getter to exhaust unwanted gas from therein, thereby ensuring a high degree of vacuum. The invention also relates to a method for making a field emission plane light source.

2. Discussion of Related Art

Recently, with the development of the plane display technology, field emission display (FED) technology has been paid more attention. FED technology potentially offers, e.g., higher brightness, lower energy consumption, broader visual angle, higher contrast than possible with liquid crystal or plasma displays. FED technology could be utilized in many fields including, e.g., personal computers, mobile communications, flat screen displays/televisions, etc.

Generally, a field emission plane light source is employed in a field emission display as a light source. A nanotube-based field emission plane light source usually includes a cathode having carbon nanotubes and an anode having a fluorescent layer. In use, a strong electrical field is provided for between the cathode and anode, the strong electrical field excites the carbon nanotubes of the cathode to emit electrons, and the electrons bombard the fluorescent layer of the anode to thereby produce visible light. For a field emission plane light source, a high degree of vacuum within an interior portion thereof is a virtual necessity. In general, the better of the degree of vacuum that is able to be generated and maintained within the field emission plane light source during the sealing process, the better of the field emission performance thereof is. To maintain the degree of vacuum within a desired range, a conventional way is to provide a getter in the inner portion thereof. Such a getter is able to exhaust a gas produced by the fluorescent layer and/or any other residual gas remaining within the field emission plane light source upon sealing and evacuation thereof. The getter is suitably selected from a group consisting of non-evaporable getters and evaporable getters.

For the evaporable getter, a high-temperature evaporating process has to be provided during the fabrication of the field emission plane light source, and a plane/surface arranged in the inner portion of the field emission plane source has to be provided to receive the evaporated getter. Thus, the cost of the fabrication of the field emission plane light source can be expected to increase, and the cathode and anode electrodes are prone to shorting during the high temperature evaporating process, thereby increasing the chance of the failure of the field emission plane light source. For the non-evaporable getter, it is typically located at a position away from the cathode, and, thus, the degree of vacuum of portions near to the cathode tends to be poorer, in the short-term, than that of portions near to the getter, at least until internal equilibrium can be reached, thereby decreasing the field emission performance of the cathode or at least potentially resulting in a fluctuating performance thereof.

What is needed, therefore, is a field emission plane light source that overcomes the above-mentioned shortcomings to ensure a high degree of vacuum thereof, thus providing a better and more steady field emission performance during the use thereof.

What is also needed is a method for making such a field emission plane light source.

SUMMARY

A field emission plane light source generally includes an anode and a cathode. The anode includes an anode substrate, an anode conductive layer formed on a surface of the anode substrate, and a fluorescent layer formed on the anode conductive layer. The cathode includes a cathode substrate facing and separated from the anode substrate, a cathode conductive layer formed on a surface of the cathode substrate facing the anode, and an electron emission layer formed on the cathode conductive layer and facing the fluorescent layer of the anode. The cathode and anode substrates define a chamber, the chamber having a sealing vacuum formed therein. The electron emission layer includes a glass matrix, a plurality of carbon nanotubes, metallic conductive particles, and getter powders dispersed therein.

A method for making a field emission plane light source generally includes the steps of:

(a) providing a certain number of carbon nanotubes, glass particles, metallic conductive particles, and getter powders; an anode with an anode conductive layer and a fluorescent layer; a cathode conductive layer; and at least one supporting member;

(b) mixing the nanotubes, the metallic conductive particles, the glass particles, and the getter powders in organic medium to form an admixture;

(c) forming a layer of the admixture on a surface of the cathode conductive layer;

(d) drying and baking the admixture at a temperature of about 300° C. to about 600° C. to form an electron emission layer on the cathode conductive layer, thereby forming a cathode; and (e) assembling the anode, the cathode, and the at least one supporting member, and sealing them to obtain the field emission plane light source.

Other advantages and novel features of the present field emission plane light source and the relating method thereof will become more apparent from the following detailed description of preferred embodiments when taken in conjunction with the accompanying drawings.

BRIEF DESCRIPTION OF THE DRAWINGS

Many aspects of the present field emission plane light source and the relating method thereof can be better understood with reference to the following drawings. The components in the drawings are not necessarily to scale, the emphasis instead being placed upon clearly illustrating the principles of the present field emission plane light source and the relating method thereof. Moreover, in the drawings, like reference numerals designate corresponding parts throughout the several views.

The exemplifications set out herein illustrate at least one preferred embodiment of the present field emission plane light source and the relating method thereof, in one form, and such exemplifications are not to be construed as limiting the scope of such a field emission plane light source and a method for making such in any manner.

DETAILED DESCRIPTION

Reference will now be made to the drawings to describe the field emission plane light source 10 and the method for making the same according to the present embodiment, in detail.

Figure 1:
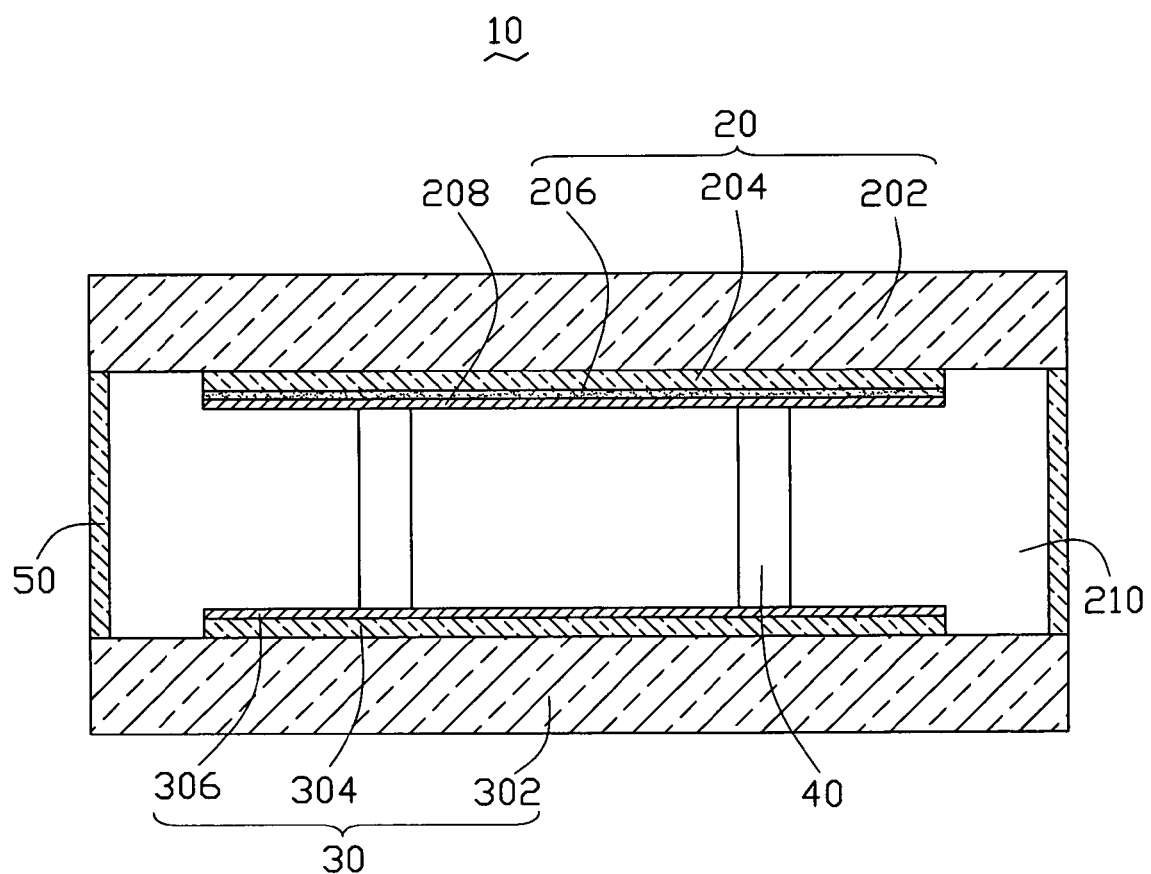
FIG. 1 is a cross-sectional view of a field emission plane light source, in accordance with an exemplary embodiment of the present device.

Referring to FIG. 1, a field emission plane light source 10, in accordance with an exemplary embodiment of the present device, is provided. The field emission plane light source 10 includes an anode 20, a cathode 30 facing the anode 20, at least one supporting member 40 disposed between the anode 20 and the cathode 30 to separate them from each other, and a sealing body 50.

The anode 20 includes an anode substrate 202, an anode conductive layer 204 formed directly on a surface of the anode substrate 202, and a fluorescent layer 206 formed on the anode conductive layer 204, in contact therewith. The anode substrate 202 is preferably a transparent glass plate. The anode conductive layer 204 is advantageously a transparent conductive film, such as an indium tin oxide (ITO) film. The fluorescent layer 206 is advantageously made of at least one of white and color fluorescent materials. Such materials are opportunely chosen so as to have many satisfactory characteristics (e.g. a high optical-electrical transferring efficiency, a low voltage, a long afterglow luminescence, etc.). In an alternative mode, an aluminum film 208 can be formed directly on a cathode-facing surface of the fluorescent layer 206, in order to improve the brightness of the field emission plane light source (due to both its electrical conductivity and reflectivity) and to help reduce the opportunity of the fluorescent layer 206 failing prematurely.

The cathode 30 includes a cathode substrate 302 facing and separated from the anode substrate 202, a cathode conductive layer 304 formed on and in contact with an anode-facing surface of the cathode substrate 302, and an electron emission layer 306 formed directly on the cathode conductive layer 304 and facing the fluorescent layer 206 of the anode 20. The electron emission layer 306 has an uninterrupted top surface facing the fluorescent layer 206. The cathode substrate 302 is advantageously made from one of silicon and silicon oxide. The cathode conductive layer 304 is advantageously a transparent conductive film (e.g., preferably a transparent indium tin oxide (ITO) film). Alternatively, the cathode conductive layer 304 can be made of a conductive material selected from the group consisting of silicon (Si), silver (Ag), copper (Cu), nickel (Ni), gold (Au). and an alloy composed of at least two such metals.

Figure 2:
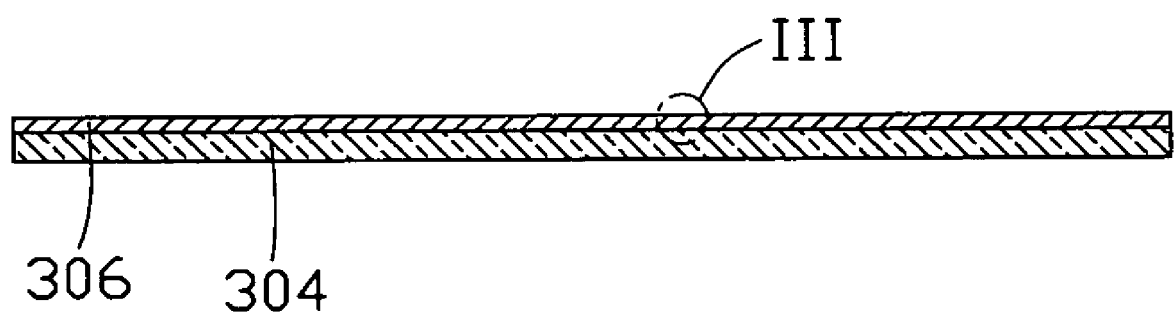
FIG. 2 is a cross-sectional view of a cathode of FIG. 1.
Figure 3:
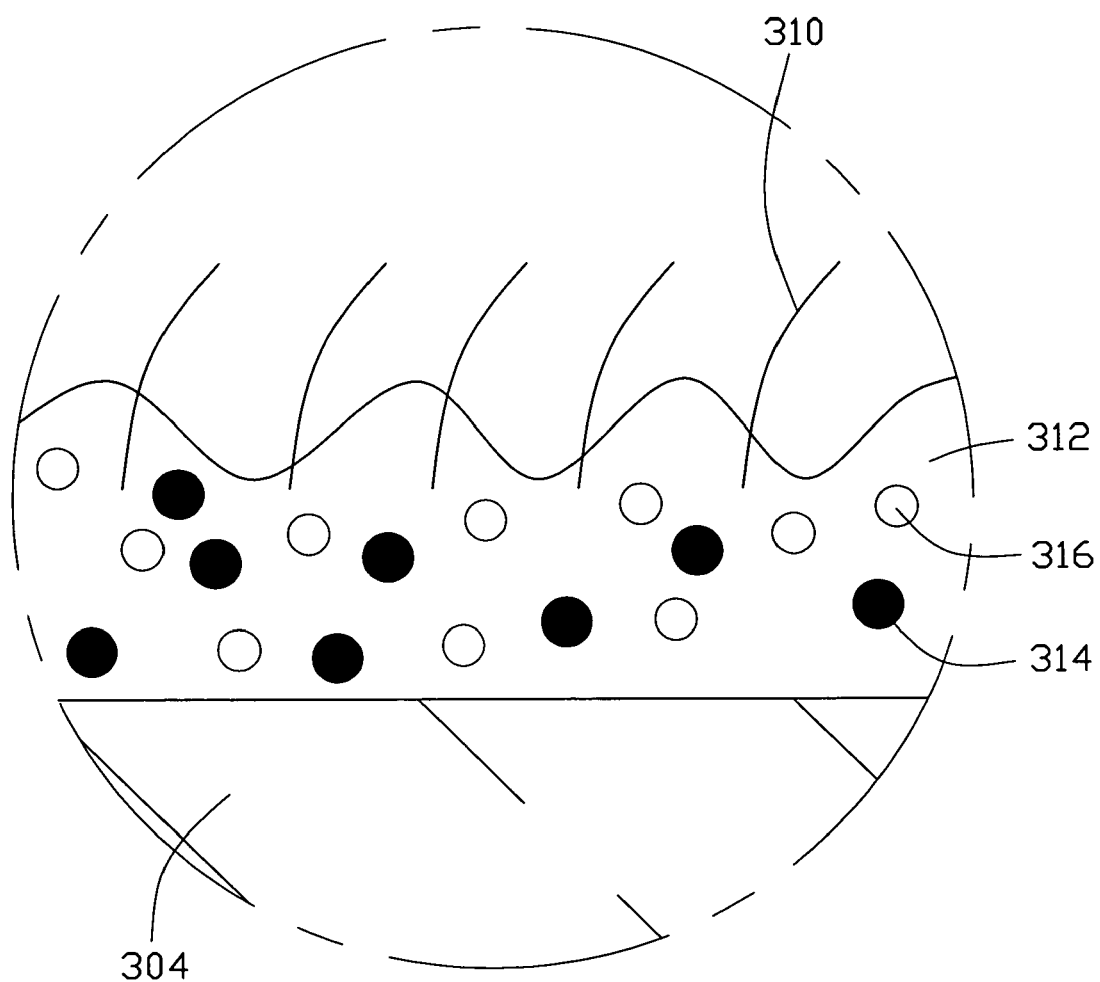
FIG. 3 is an enlarged view of a circled portion III of FIG. 2.

Referring to FIGS. 2 and 3, the electron emission layer 306 includes a plurality of carbon nanotubes 310, metallic conductive particles 314, and getter powders (i.e., in the form of particles/grains) 316; and glass 312. The glass 312 serves as a matrix material in which the carbon nanotubes 310, metallic conductive particles 314, and getter powders 316 are dispersed. A length of each of the nanotubes 310 is advantageously in the range from about 5 micrometers to about 15 micrometers, a diameter thereof is advantageously in the range from about 1 nanometer to about 100 nanometers, and one end thereof is exposed out of (i.e., anchored within and extending therefrom) a top surface of the electron emission layer 306. The metallic conductive particles 314 are benefi- cially made of a material of silver (Ag) or indium tin oxide (ITO) and are used to electrically connect the cathode conductive layer 304 with the nanotubes 310. The getter powders 316 are made of a non-evaporating getter material (i.e., a material generally selected from the group consisting of titanium (Ti), zirconium (Zr), hafnium (Hf), thorium (Th), aluminium (Al), thulium (Tm), and alloys substantially composed of at least two such metals). The average diameter of the getter powders 316 is advantageously in the range from about 1 micrometer to about 10 micrometers.

The at least one supporting member 40 is advantageously made of transparent and hard material, in order to protect the field emission plane light source 10 from the atmospheric pressure thereon, thereby ensuring the safety thereof. Preferably, the field emission plane light source 10 has four supporting members 40, two of each arranged on two opposite sides thereof.

The sealing body 50 is made from a sealing material (e.g., glass) to seal the edges of the field emission plane light source 10 to thereby form a sealed chamber in an inner portion thereof. Upon forming of such a sealed chamber, it is possible for the interior of the field emission plane light source 10 to be evacuated, achieving a vacuum therein.

A strong electrical field is provided between the anode conductive layer 204 of the anode 20 and the electron emission layer 306 of the cathode 30. The strong field excites the carbon nanotubes 310 in the electron emission layer 306 to emit electrons. The electrons bombard the fluorescent layer 206 of the anode 20, thereby producing visible light. Furthermore, the getter powders 316 exhaust the gas produced by the fluorescent layer 206 and/or any potential residual gas in the field emission plane light source 10, thereby ensuring the field emission plane light source 10 is able to maintain a high degree of vacuum.

A method for making the above-mentioned field emission plane light source 10 generally includes:

(a) providing a certain number of carbon nanotubes 310, glass particles (later melted to form a glass matrix 312), metallic conductive particles 314, and getter powders 316; an anode 20 with an anode conductive layer 204 and a fluorescent layer 206; a cathode substrate 302 with a cathode conductive layer 304; and at least one supporting member 40;

(b) mixing the nanotubes, the metallic conductive particles 314, the glass particles, and the getter powders 316 in an organic medium to form an admixture;

(c) forming a layer of the admixture directly on a surface of the cathode conductive layer 304, the surface facing the anode 20;

(d) drying and then baking the admixture at a temperature of about 300° C. to about 600° C. to form an electron emission layer 306 on the cathode conductive layer 304 thereby forming a cathode 30; and (e) thereafter, assembling the anode 20, the cathode 30 and the at least one supporting member 40, and sealing them to obtain the field emission plane light source 10.

In step (a), the carbon nanotubes 310 are formed by an appropriate technology (e.g., a chemical vapor deposition (CVD) method, an arc-discharge method, a laser ablation method, a gas phase combustion synthesis method, etc.). Preferably, the average length of the nanotubes 310 is in the range from about 5 micrometers to about 15 micrometers. The glass particles are selected from glass powders with a low melting temperature (e.g., glass powders with a low melting temperature in the range of about 350° C. to about 600° C., and preferably composed, in part, of silicon oxide ($SiO_2$), boric trioxide ($B_2O_3$), zinc oxide (ZnO), and vanadium pentoxide ($V_2O_5$)). The average diameter of the glass particles is preferably in the range of about 10 nanometers to about 100 nanometers. The metallic conductive particles 314 are ball-milled, yielding particle diameters in the range from about 0.1 micrometer to about 10 micrometers. The getter powders 316 are also ball-milled, forming powder diameters in the range from about 1 micrometer to about 10 micrometers. Preferably, the getter powders 316 are made of a getter material with an activity temperature of about 300° C. to about 500° C. (e.g., an alloy containing Zr and Al). The anode conductive layer 204 is formed on a substrate 202 by, e.g., a sputtering method or a thermal evaporating method, and the fluorescent layer 206 is formed on the anode conductive layer 204 by, for example, a depositing method. The cathode conductive layer 304 is formed on the cathode substrate 302 by a sputtering method or a thermal evaporating method.

In step (b), the organic medium is composed of a certain amount of solvent (e.g., terpineol, etc.), and a smaller amount of a plasticizer (e.g., dimethyl phthalate, etc.) and a stabilizer (e.g., ethyl cellulose, etc.). The percent by mass of the getter powders 316 is in the range of about 40% to about 80% of the admixture. The process of the mixing is preferably performed at a temperature of about 60° C. to about 80° C. for a sufficient period of time (e.g., about 3 hours to about 5 hours). Furthermore, low-power ultrasound is preferably applied in step (b), to improve the dispersion of the carbon nanotubes 530, as well as the metallic conductive particles 314 and the getter powders 316.

Step (c) is performed in a condition of a low dust content (e.g., being preferably lower than 1000 mg/m$^3$).

In step (d), the process of drying is to volatilize the organic medium from the cathode conductive layer, and the process of baking is to melt the glass particles, thereby forming the glass matrix 312 and yielding the electron emission layer 306. The processes of drying and baking are performed in a vacuum condition and/or in a flow of a protective/inert gas (e.g., noble gas, nitrogen). After baking, an outer surface of the electron emission layer 306 is preferably abraded and/or selectively etched, in order to expose ends of at least a portion of the nanotubes 310. The exposure of such ends increases the field emission performance of the electron emission layer 306.

In step (e), a sealing material (e.g., a glass with a melting temperature of about 350° C. to about 600° C.) is applied so as to extend between and contact edges of both the anode 20 and the cathode 30 of the field emission plane light source 10 and softened/formed at a temperature of about 400° C. to about 500° C. The sealing material forms the sealing body 50 after cooling, to establish a chamber within the field emission plane light source 10 that can then be evacuated. The sealing body 50, additionally, promotes the mechanical integrity of the field emission plane light source 10, helping to space the anode 20 from the cathode 30.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A field emission plane light source comprising:
   an anode comprising an anode substrate, an anode conductive layer formed on a surface of the anode substrate, and a fluorescent layer formed on the anode conductive layer; and
   a cathode comprising a cathode substrate facing and separated from the anode substrate, a cathode conductive layer formed on a surface of the cathode substrate, and an electron emission layer formed on the cathode conductive layer and facing the fluorescent layer of the anode; the cathode and anode substrates forming a sealed chamber therebetween; and the electron emission layer comprising a glass matrix and a plurality of carbon nanotubes, metallic conductive particles electrically connecting the cathode conductive layer with the carbon nanotubes, and getter powders dispersed within the glass matrix.

2. The field emission plane light source as described in claim 1, wherein the getter powders are made of a non-evaporating getter material.

3. The field emission plane light source as described in claim 2, wherein an average diameter of the getter powders is in the range from about 1 micrometer to about 10 micrometers.

4. The field emission plane light source as described in claim 1, wherein the getter powders are comprised of a material selected from the group consisting of titanium, zirconium, hafnium, thorium, aluminum, thulium, and alloys composed of at least two such metals.

5. The field emission plane light source as described in claim 1, wherein an average diameter of the nanotubes is in the range from about 1 nanometer to about 100 nanometers, and an average length thereof is in the range from about 5 micrometers to about 15 micrometers.

6. The field emission plane light source as described in claim 1, wherein the anode conductive layer is an indium tin oxide film.

7. The field emission plane light source as described in claim 1, wherein the metallic conductive particles are made of a material selected from indium tin oxide and silver, and an average diameter thereof is in the range of about 0.1 micrometer to about 10 micrometers.

8. The field emission plane light source as described in claim 1, wherein an aluminum film is formed on the fluorescent layer of the anode.

9. The field emission plane light source as described in claim 1, wherein the cathode conductive layer is comprised of at least one material selected from the group consisting of indium tin oxide, silicon, silver, copper, nickel, and gold and an alloy composed by at least two such metals.

10. The field emission plane light source as described in claim 1, wherein at least one of the anode substrate and the cathode substrate is a transparent glass plate.

11. The field emission plane light source as described in claim 2, wherein the non-evaporating getter material has an activity temperature of about 300° C. to about 500° C.

12. The field emission plane light source as described in claim 1, wherein ends of at least some of the carbon nanotubes are exposed out of the top surface of the electron emission layer.

13. The field emission plane light source as described in claim 1, further comprising a sealing body for sealing edges of the field emission plane light source to thereby form a sealed chamber in an inner portion thereof.

14. The field emission plane light source as described in claim 13, wherein the material of the sealing body is glass with a melting temperature of about 350° C. to about 600° C.

15. The field emission plane light source as described in claim 1, wherein the electron emission layer has an uninterrupted top surface facing the fluorescent layer.

* * * * *